United States Patent [19]

Takeda

[11] Patent Number: 4,579,599
[45] Date of Patent: Apr. 1, 1986

[54] PROCESS FOR FLUIDIZED CONTACT IN A MIXED PHASE

[75] Inventor: Hiroo Takeda, Kawasaki, Japan

[73] Assignee: Nippon Oil Company, Ltd., Tokyo, Japan

[21] Appl. No.: 548,829

[22] Filed: Nov. 4, 1983

[30] Foreign Application Priority Data

Nov. 5, 1982 [JP] Japan .............................. 57-193378

[51] Int. Cl.$^4$ .............................................. B08B 3/00
[52] U.S. Cl. .................................. 134/25.1; 422/140; 422/147
[58] Field of Search ................... 134/25.1; 23/313 FB; 201/31; 208/163, 164; 261/94; 423/DIG. 16; 422/139, 140, 147, 227, 230, 231

[56] References Cited

U.S. PATENT DOCUMENTS

| 3,288,567 | 11/1966 | Graham .......................... 422/147 X |
| 3,754,993 | 8/1973 | Oguchi et al. ..................... 134/25.1 |
| 3,826,739 | 7/1974 | Kubo et al. ..................... 134/25.1 X |
| 4,108,682 | 8/1978 | Takeda et al. ..................... 134/25.1 |

Primary Examiner—Richard V. Fisher
Assistant Examiner—Sharon T. Cohen
Attorney, Agent, or Firm—Sherman and Shalloway

[57] ABSTRACT

A process for fluidized contact in a mixed phase by intimately contacting a liquid or a mixture of a liquid and a gas with solid particles in a contact vessel having a double pipe contact portion composed of an inner pipe contact portion and an outer pipe contact portion, and a packed bed provided to surround the upper part of the inner pipe, includes the steps of:

(1) feeding the liquid or the mixture of the liquid and the gas from the lower part of the contact vessel to the inner pipe contact portion to flow up the solid particles inside the inner pipe contact portion along with the liquid or the mixture of the liquid and the gas, further allowing the blend to overflow into the packed bed from the upper part of the inner pipe contact portion, (2) separating part of the liquid or the mixture of part of the liquid and the gas from the solid particles and most of the liquid in the packed bed, (3) flowing up the part of the liquid or the mixture of part of the liquid and the gas in the contact vessel, uniformly contacting the liquid with the gas in the upper part of the contact vessel, then separating the liquid from the gas, withdrawing them from the contact vessel respectively, and (4) flowing down most of the liquid and the solid particles in the outer pipe contact portion up to the lowest part of the double pipe contact portion.

12 Claims, 4 Drawing Figures

U.S. Patent        Apr. 1, 1986        4,579,599
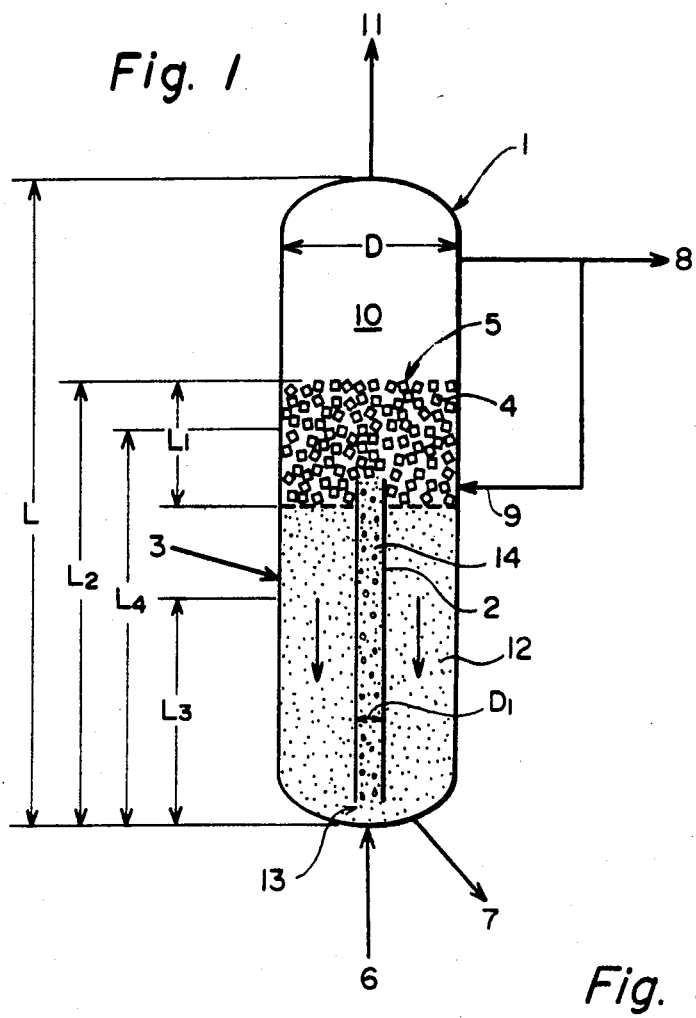
Fig. 1
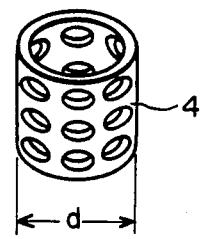
Fig. 2
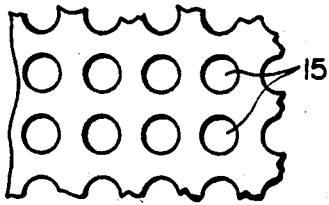
Fig. 3-b
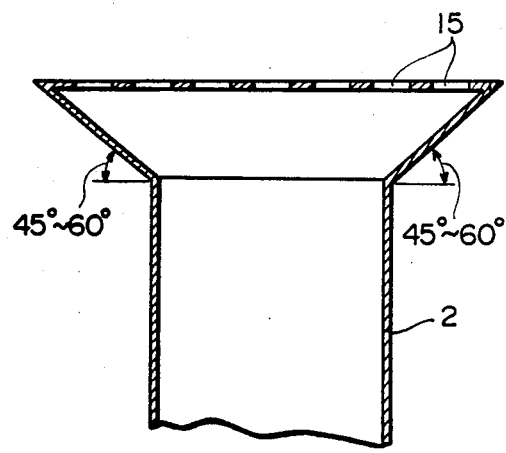
Fig. 3-a

PROCESS FOR FLUIDIZED CONTACT IN A MIXED PHASE

FIELD OF THE INVENTION

This invention relates to a process for fluidized contact by intimately contacting a liquid or a mixture of a liquid and a gas with solid particles.

More specifically, this invention relates to a process which comprises inserting an inner pipe into a contact vessel, providing a double pipe contact portion having an inner pipe contact portion and an outer pipe contact portion, a packed bed having a porous packing and a gas-liquid contact portion wherein a gas is uniformly contacted with a liquid, then feeding solid particles into the double pipe contact portion, supplying a liquid or a mixture of a liquid and a gas into the inner pipe contact portion from the lower part of the contact vessel, contacting the liquid or the mixture of the liquid and the gas with the solid particles in the inner pipe contact portion of the double pipe contact portion and the packed bed, further contacting the liquid with the solids in the outer pipe contact portion, and circulating the blend to the inner pipe contact portion. The mixture of the liquid and the gas will be simply referred to a "fluid" hereinafter.

BACKGROUND OF THE INVENTION

Many proposals have been made to contact a liquid alone or a fluid (a mixture of a liquid and a gas) with solid particles. These proposals were made, for example, in Japanese Patent Publications Nos. 26105/67 and 29162/72. Japanese Patent Publication No. 26105/67 discloses that when solid particles are placed in a contacting vessel, and a fluid is introduced into the vessel from its lower parts, the layer of the solid particles expands from its initially packed state, and the solid particles make a substantial motion, behaving as if they were a liquid. The fluidized bed is formed usually depending upon the specific gravity of the particles, their size, the amount of the particles accomodated, and the flow rate of the fluid. Furthermore, Japanese Patent Publication No. 29162/72 contemplates the improvement of the contact between a fluid and solid particles by providing an inside cylindrical body within a contacting vessel and thus circulating the solid particles regularly.

Contacting of a fluid with solid particles utilizing fluidized beds as mentioned above is a superior expedient because it can ensure intimate and uniform contact. Furthermore, according to methods of this type, the solid particles can be exchanged while the contact between the fluid and the solid particles is continued. This is a characteristic not seen in fixed-bed methods.

However, the fluidized state of solid particles is essentially dominated by the flow rate of the fluid since the fluidized bed method usually comprises introducing a fluid from the lower part of a contacting vessel, contacting the solid particles with the fluid while fluidizing the solid particles within the contact vessel, and then withdrawing the treated fluid from the vessel. If the flow rate of the fluid is too low, the solid particles cannot be fluidized uniformly, and therefore, the contact is non-uniform.

Furthermore, when the flow rate of the fluid exceeds a certain limit, the stability of the fluidized bed is rapidly destroyed, and the solid particles flow out of the system by being carried on the fluid. Especially when the fluid contains the bubbles, the interfaces of the bubbles interfere with the solid particles, and the bubbles entrain the solid particles irrespective of the flow rate of the fluid, so that the fluidized bed becomes very unstable.

Generally, the smaller the size of solid particles, the larger is the area of contact, and the more intimate is the contact between the solid particles and a fluid, but there is a stronger tendency that the solid particles flow out of the contacting vessel. In such a case, measures are taken to feed the solid particles as a slurry in the fluid to be treated, withdrawing the solid particles as a slurry in the fluid, and allowing the slurry to stand in a separate vessel thereby to separate the solid particles from the fluid. However, there is a drawback that the operation becomes quite complicated.

In Japanese Laid-Open Patent Publication Nos. 77401/75, 125667/76 and 1293/82, the fluidized condition in the contact vessel is controlled with the packing. Controlling of the fluidized condition is better than that in said Japanese Patent Publication Nos. 29162/72 and 26105/67. However, in the contact of a gas, a liquid and solids, an efficiency of contact decreases because the fluidization in the packed bed of particles is extremely moderate, and clogging undesirably occurs in the packed bed to hinder the regular circulation of solid particles. Thus, the problems are encountered when it is used in a reactor involving a variety of reactions.

This invention is to provide a contact process that remedies the above drawbacks of the fluidized bed and can maintain the very stable fluidized state of solid particles without flowing substantial amounts of solid particles out of the contact vessel.

SUMMARY OF THE INVENTION

This invention is to provide a process for fluidized contact in a mixed phase by intimately contacting a liquid or a fluid (a mixture of a liquid and a gas) with solid particles, wherein a double pipe contact portion having an inner pipe contact portion and an outer pipe contact portion is formed by inserting an inner pipe into a lower part of a contact vessel in such a way that upper and lower parts of the inner pipe communicate with middle and lower parts of the contact vessel respectively, the physical condition of the double pipe contact portion being such that the ratio of the diameter of the outer pipe to the diameter of the inner pipe is 2 to 10, a packed bed is provided by filling a porous packing in the inside of the contact vessel so as to surround at least the upper part of the inner pipe, the physical conditions of said packed bed being such that the ratio of superficial volume occupied by the packed bed to real volume of the packing is at least 1.3 and the ratio of the average pore diameter of the pores of the packing to the average particle diameter of the solid particles is 1.1 to 10, and the solid particles are filled in the outer pipe contact portion, said process comprising (1) feeding the liquid or the fluid (the mixture of the liquid and the gas) from the lower part of the contact vessel to the inner pipe contact portion to flow up the solid particles inside the inner pipe contact portion along with the liquid or the fluid (the mixture of the liquid and the gas), further allowing the blend to overflow into the packed bed from the upper part of the inner pipe contact portion, (2) separating part of the liquid or part of the fluid (the mixture of part of the liquid and the gas) from the solid particles and most of the liquid in the packed bed, (3) flowing up the part of the liquid or the part of the fluid (the mixture of part of the liquid and the gas) in the contact vessel, uniformly contacting the liquid with the gas in the upper part of the contact vessel, then separating the liquid from the gas, withdrawing them from the contact vessel respectively, (4) flowing down said most of the liquid and the solid particles in the outer pipe contact portion up to the lowest part of the double pipe contact portion, circulating the blend into the inner pipe contact portion along with a liquid or a fluid (a mixture of a liquid and a gas) which is freshly supplied, (5) withdrawing part of the solid particles from the lower part of the double pipe contact portion continuously or intermittently, and introducing fresh solid particles from the upper part of the outer pipe contact portion.

DESCRIPTION OF THE DRAWINGS

FIG. 1 is a longitudinal sectional view of an example of a contact vessel used in this invention;

FIG. 2 is a view illustrating an example of a porous packing used in this invention;

FIG. 3 is a view illustrating an example of an inner pipe used in this invention;

FIG. 3-*a* is a longitudinal sectional view of an upper end of the inner pipe; and FIG. 3-*b* is a cross-sectional view of part of the upper end of the inner pipe.

DETAILED DESCRIPTION OF THE INVENTION

In this invention, a liquid or a fluid (a mixture of a liquid and a gas) is intimately contacted with solid particles. An inner pipe is inserted into a lower part of a contact vessel to provide a double pipe contact portion having an inner pipe contact portion and an outer pipe contact portion in order to improve an efficiency of contact in the contact vessel making use of a difference in density. The fluidized contact of a gas, a liquid and solids is accelerated in the inner pipe contact portion of said double pipe contact portion, and the contact of a liquid and solids in the outer pipe contact portion, respectively. On this occassion, because the gas exists in the inner pipe contact portion compared with the outer pipe contact portion, a difference in density occurs between the inner and outer pipe contact portions, and the flow rate of the inner pipe contact portion comes to be higher than that of the outer pipe contact portion.

As the solid particles are circulated in the inner pipe contact portion, it is prevented that the gas grow into large bubbles owing to gathering, and the gas becomes fine bubbles to extremely increase the efficiency of contact and expedite the uniform fluidization in the inner and outer pipe contact portions. Further, since the liquid or the fluid is intimately contacted with the particles in the same contact vessel, a packed bed is formed with a packing present in the middle portion of the contact vessel. Still further, a gas-liquid contact portion wherein the gas finely dispersed by the packed bed is uniformly contacted with the liquid is provided in the upper part of the contact vessel.

Referring to the drawings, a preferable embodiment of this invention is explained. As illustrated in FIG. 1, a substantially cylindrical straight inner pipe 2 is concentrically positioned in a substantially cylindrical contact vessel 1 (the inside diameter is indicated at D), and inserted thereinto such that the upper and lower parts of the inner pipe communicate with middle and lower parts of the contact vessel to provide a double pipe contact portion having an inner pipe contact portion 14 and an outer pipe contact portion 12. A packing 4 is filled in the inside of the contact vessel so as to surround at least the upper part of the inner pipe to provide a packed bed 5. In this manner, the effect of contact between the fluid and the solid particles is markedly increased in comparison with the conventional fluidized bed.

The packing to form the packed bed has to be porous. For example, a porous sheet containing a number of small pores or a net having a suitable mesh size is made into a small object of a suitable size which can be used as the porous packing of this invention. FIG. 2 shows a porous Raschig ring thus produced which is a preferred example of the porous packing used in this invention.

Moreover, one of the important features of this invention is that the above-described inner pipe is located in the lower part of the packed bed formed by said packing as shown in FIG. 1.

In this invention, the inner pipe situated in the packed bed is a substantially cylindrical straight pipe, but it may be a tapered pipe enlarged upward with its upper end having an angle of 45° to 60° as shown in FIG. 3-*a*. The above angle is, as will be later described, a minimal angle at which the gas in the blend of the fluid and the solid particles rising from below is effectively separated in order not to feed the gas into the outer pipe contact portion in the double pipe contact portion.

FIG. 3-*b* illustrates an opening at the upper end of the inner pipe. Said opening is made of a porous sheet shown in FIG. 3-*b*. The diameter of pores 15 may be less than the minimal size (for example, the diameter (d) of the packing illustrated in FIG. 2) of the packing inserted into the contact vessel. It is moreover advisable to select the number of pores of the porous sheet according to the flow rate of the gas within such a range that no difference in pressure occurs between the inner and outer pipes.

In FIG. 1, the solid particles supplied from 3 of the contact vessel 1 are fluidized (flowed up) within the inner pipe contact portion 14 along with a liquid or a fluid fed from 6 and overflow into the packed bed 5. In the packed bed 5, the mixture of the gas, the liquid and the solids overflowing from the inner pipe contact portion in a thoroughly mixed state are separated into part of the liquid or part of the fluid on one hand and most of the liquid and the solid particles on the other. The former rises in the contact vessel and is separated into the liquid and the gas in the upper part 10 of the contact vessel. The liquid and the gas are taken out of the contact vessel via 8 and 11, respectively. The latter flows down in the outer pipe contact portion 12 up to the lowest part 13 of the contact vessel and circulates into the inner pipe contact portion 14 along with a liquid or a fluid freshly supplied. That is, the contact involving the flowing up of the fluid and the solid particles is conducted in the inner pipe contact portion 14 of the contact vessel, the contact involving the flowing down of the liquid and the solid particles in the outer pipe contact portion 12, and the complete blending of the fluid and the solid particles in the packed bed 5, respectively.

Talking of the fluidization of the solid particles, said solid particles are fluidized by the liquid or the fluid fed from the lower part of the contact vessel and are expanded consequently. In FIG. 1, $L_3$ is the height of solid particles when they stay, and $L_4$ is the height of solid particles when they are in fluidization. That is, when the solid particles are not fluidized but stay, the level of the upper end of the solid particle layer is $L_3$, but raised up to $L_4$ by fluidization. Thus, the solid particles are fluidized and expanded. However, when the fluidization in the process of this invention is compared with that in the fluidized bed free of the packing, a rate of expansion of the solid particles can be suppressed to an extremely low level. It means that the porous packing used in this invention serves to control the fluidization of the solid particles, thereby providing a condensed fluidized bed in the process of this invention.

In this invention, part of the liquid flowed out of the contact vessel via a pipe 8 may be recirculated to 9 in order to maintain the flowing down of the solid particles in the outer pipe contact portion.

When the solid particles are deteriorated, they are removed from a pipe 7 and fresh solid particles are charged via a pipe 3. At this time, it is possible to charge or remove the solid particles without changing the flow rate of the fluid, and the operation makes the conditions of fluidization almost unchanged.

The shape of the porous packing used in this invention may be any desired one, such as a cylindrical, ring-like, net-like, coil-like or star-like shape. The material for the porous packing may be any suitable material to be chosen according to the contacting conditions. Examples of the material are refractory inorganic substances such as metals, porcelain clay, silica, alumina or magnesia, and polymeric compounds such as polyethylene, polypropylene, polyvinyl chloride or poly tetrafluoroethylene.

The present invention has been established on the basis of the finding that in effectively fluidizing the fluid and the solid particles utilizing a difference in density generated between the inner and outer contact portions by inserting the inner pipe into the contact vessel and contacting the fluid with the solid particles in the packed bed filled with the porous packing, the following unpredictable effects result when the packed bed meets the specific conditions. That is, the motion of the solid particles is properly controlled, the condition of contact between the fluid and the solid particles is maintained quite uniform and stable, and the solid particles seldom or never flow out of the contact vessel. The above specific conditions are two conditions that the ratio of superficial volume occupied by the porous packed bed to real volume of the porous packing is at least 1.3 and the ratio of the average pore diameter of the pores of the porous packing to the average particle diameter of the solid particles is 1.1 to 10.0.

The term "real volume of a packing", as used in the present specification and claims, denotes the volume which is occupied only by the porous packing used in this invention. On the other hand, the volume which is occupied by a geometrical contour of the packing will be referred to in this application as "the bulk volume of a packing".

This will be specifically explained with regard to the porous Raschig ring shown in FIG. 2 as an example. The "real volume of the packing" is then the volume which is occupied only by the porous sheet which constitutes the porous Raschig ring, and the "bulk volume of the packing" is equal to the volume of a cylinder which is a contour of the Raschig ring (the volume being $\frac{1}{4}\pi r^2 \times h$ wherein r is the outside diameter of the cylinder, and h is its height).

The term "superficial volume occupied by a packed bed", as used in the present specification and claims, denotes the volume which is occupied in space by a porous packed bed formed as a result of filling a porous packing. This volume is equal to the sum total of the bulk volume of all the entire packing pieces and the volume of the space among adjacent packing pieces. The superficial volume occupied by a porous packed bed in $\pi/4\ D^2L$ in FIG. 1.

The term "average pore diameter of a packing", as used in the present specification and claims, is a measure of the size of the pores of the porous packing, and defined as the diameter of a circle which has an area equal to an average value of the areas of the porous packing. Where the porous packing is a Raschig ring made of a porous sheet such as shown in FIG. 2, the average area of the pores should be calculated only on the basis of the areas of the pores provided on the porous sheet as a material, and the areas of the top and bottom surfaces of the cylindrical Raschig ring should not be incorporated in this calculation. Likewise, when the porous packing is made of a small object obtained from a net, the average area of the pores should be calculated only from the areas of the meshes of the net. When the porous packing used in this invention is a coily packing, the space between lines forming the coil is regarded as a pore of the porous packing, and the average pore diameter is defined as an average value of the areas of these spaces.

The solid particles to be contacted with fluids in the present invention assume various shapes, for example, spheres, or pellets, or cylindrical shapes (in the case of extrusion-molded solid particles).

In the present invention, the ratio of the superficial volume occupied by the porous packed bed to the real volume of the porous packing should be at least 1.3. If this ratio is less than 1.3, the fluidization of the solid particles becomes unstable, and the solid particles cannot be maintained in a proper fluidized state. Furthermore, the real volume of the porous packing in the porous packed bed becomes too large, and consequently, the effective contact space is very much reduced. When the porous packing is made of a wire net, the ratio of the superficial volume occupied by the porous packed bed to the real volume of the porous packing can be very high, and even if this ratio is more than 100, good contact can be maintained. However, in view of the strength of the metallic material, the ratio is desirably not more than 100. When the porous packing is made of a refractory such as porcelain clay or a polymeric compound, the ratio is desirably not more than 50 in view of the strength of the porous packing.

Furthermore, in the present invention, it is necessary that the ratio of the average pore diameter of the pores of a porous packing to the average particle diameter of solid particles should be within the range of 1.1 to 10.0, preferably 1.5 to 5.0. If this ratio is less than 1.1, it is difficult for the solid particles to move freely through the pores of the porous packing, and a uniform fluidization of the solid particles within the contacting vessel and the porous packed layer in the upper part of the contacting vessel cannot be maintained. On the other hand, if this ratio exceeds 10.0, the action of the porous packing to control the motion of the solid particles is reduced, and the desired fluidized state cannot be achieved, and consequently, the flow-out of the solid particles from the contacting vessel cannot be prevented.

Desirably, the average particle diameter of the solid particles used in this invention is usually 0.1 to 10 mm. It is also desirable that the true specific gravity of the solid particles is 1.20 to 8.00, and its apparent specific gravity is 0.10 to 2.00.

A cylindrical wire net can also be used as a porous packing in the present invention, and in this case, the ratio of the superficial volume occupied by the porous packed bed to the real volume of the porous packing can be varied over a wide range by changing the diameter of the cylinder while the real volume of the packing remains unchanged. It has been found however that if the diameter of the cylinder is increased too much, the bulk volume of the packing becomes too large for the space among adjacent packing pieces, and this adversely affects the flow of the solid particles. Thus, it is not desirable in such a case that the total bulk volume of the packing in the packed bed extremely differs from the total space among adjoining packing pieces.

In this invention, a method of irregularly filling the packing is preferable to a method of regularly filling the packing.

The relationship between the diameter D of the contact vessel and the height $L_1$ of the packed bed in this invention is preferably such that the ratio of $L_1$ to D is 1 to 20, preferably 3.0 to 15.0.

In the process of this invention, it is desirous that the following condition is met:

$$D/D_1 = 2-10, \text{ preferably } D/D_1 = 4-8$$

wherein D is the diameter of the outer pipe and $D_1$ is the diameter of the inner pipe in the contact vessel.

Moreover, the operation should be conducted such that the level of the upper end of the layer of expanded solid particles is maintained in the inside of the packed bed. Where the level of the upper end of said layer rises beyond the upper end of the packed bed, the solid particles undesirably flow up together beyond said upper end.

In performing the process of this invention, it is advisable to satisfy the following conditions:

$$U_{f1} < U_1 < 12.0 \text{ (cm/sec)} \quad (1)$$

$$0 < U_g < 8.0 \text{ (cm/sec)} \quad (2)$$

wherein $U_1$ is the superficial liquid velocity (based on the inner pipe) of the liquid in the contact zone, $U_g$ is the superficial gas velocity (based on the inner pipe) of the gas and $U_{f1}$ is the minimum fluidization velocity (based on the inner pipe) of solid particles caused by the liquid. That is, it is preferable that when the solid particles are contacted with the liquid alone, the operation is conducted to meet the equation (1) and when the solid particles are contacted with the mixture of the liquid and the gas, the operation is conducted to meet both the equations (1) and (2). More preferable is that the operation is conducted to meet the following conditions:

$$2.0 \text{ (cm/sec)} < U_1 < 6.0 \text{ (cm/sec)} \quad (3)$$

$$0 < U_g < 4.0 \text{ (cm/sec)} \quad (4)$$

In regard to the relationship between the amount of solid particles packed and the height of the packed bed, it is preferable to meet the following conditions:

$$L_3/L_2 = 0.10-0.70$$

$$L_4/L_3 = 1.1-4.0$$

$$L_4/L_2 < 1$$

wherein $L_2$ is the height of solid particles up to the upper end of the packed bed, $L_3$ is the height of solid particles when they stay and $L_4$ is the height of solid particles in fluidization.

More preferable is to meet the following conditions.

$$L_3/L_2 = 0.20-0.60$$

$$L_4/L_3 = 1.1-2.5$$

$$L_4/L_2 = 0.3-0.9$$

One of the great advantages in the contact process of this invention is that by utilizing the difference in density of the inner and outer pipe contact portions provided by inserting the inner pipe into the lower part of the contact vessel, the liquid and the solid particles can be rapidly circulated and the rate of expansion of solid particles be reduced to an extremely low level to increase the concentration of solid particles as compared with the conventional contact processes utilizing the fluidized beds.

Accelerating the circulation of the solid particles in the same contact vessel and increasing the concentration of the solid particles are of utmost significance in reaction and chemical engineering, and results in an advantageous contact between fluids and solid particles. Furthermore, since the expansion of solid particles can be stably and markedly reduced, the solid particles scarcely flow out of the contacting vessel, and no special equipment is required to separate and collect the solid particles.

Another great feature of this invention is exhibited when a gas is present as bubbles in contacting a fluid with solid particles in the packed bed. With the conventional contacting methods using fluidized beds, bubbles are not uniformly distributed but tend to gather at the central part of the contact zone. As a result, fine bubbles as initially introduced into the contacting vessel grow into large ones as a result of gathering at the central part, and rise as large bubbles in the contact zone. When bubbles grow into large sizes, a uniform contact of liquid-gas-solid particles is greatly impeded, and the solid particles are more liable to flow out of the contacting vessel as a result of adsorption to, and entraining by, the bubbles. In contrast, according to the process of this invention, bubbles are dispersed uniformly and finely in the contact zone, and the tendency toward gathering at the central part can be completely prevented. Consequently, bubbles do not grow into large sizes as in the conventional methods, but a uniform contact of the bubbles with the solid particles can be achieved, and various troubles ascribable to the firm adsorption of the solid particles to the bubbles can be completely avoided.

Accordingly, the contacting process of this invention permits a far more uniform contact between fluids and solid particles than do the conventional contacting methods. In view of the fact that when a fluid contains bubbles, a uniform contact of the fluid with solid particles and the separation of the solid particles are very difficult with the conventional methods, the process of this invention is an especially advantageous process for contacting a fluid with solid particles, and separating them.

The novel fluidized contact process of this invention can be applied to various processes, for example, physical treatments such as absorption, drying, adsorption, desorption, or washing, and chemical treatments such as oxidation, reduction, decomposition, or hydration, especially to the isomerization, dehydrogenation, polymerization reforming, or alkylation of hydrocarbons, or to the hydrogenation treatments thereof, such as hydrogenative decomposition, hydrogenation, or hydrodesulfurization.

The following Examples illustrate the present invention.

EXAMPLE 1

Experiment was performed under the conditions shown in Table 1 using the same type of equipment as shown in FIG. 1.

TABLE 1

| | |
|---|---|
| Dimension of the contacting vessel | $L = 200$ cm<br>$D = 10$ cm<br>$D_1 = 2.5$ cm |
| Packing (wire net) | Material, stainless steel (SUS 27); size 15 mm (diameter) × 15 mm (height); mesh 2.0 mm × 2.0 mm; thickness of the wire, 0.5 mm in diameter. |
| Solid particles | Particles of a Co—Mo catalyst on a silica-alumina carrier; spherical with a diameter of 0.9 mm; true specific gravity 3.22. |
| Properties of fluid | Liquid (kerosene)<br>Density 0.783 g/cc (20° C.)<br>Viscosity $1.28 \times 10^{-2}$ (g/cm.sec.) (20° C.)<br>Gas ($N_2$ gas)<br>Density $1.165 \times 10^{-3}$ (g/cc) (20° C.)<br>Viscosity $1.75 \times 10^{-4}$ (g/cm.sec.) |
| State of packing | $L_1 = 80$ cm, $L_2 = 160$ cm, $L_3 = 60$ cm; the ratio of the superficial volume occupied by the porous packed bed to the real volume of the packing = 21.5; the ratio of the average pore diameter of the porous packing to the average diameter of solid particles = 2.22 |

The experiment was conducted under the above conditions while introducing the liquid at a superficial velocity of 4.0 cm/sec. and the gas ($N_2$ gas) at a superficial velocity of 1.0 cm/sec. The expansion factor of the solid particles could be reduced to below 2.0, and the fluidized state was very uniform. No solid particle flowed out of the contacting vessel.

When the above experiment was conducted without using the porous packing, the expansion factor of the solid particles increased to above 3.0. The amount of the solid particles entrained in the gas was as much as 5% by volume, and gas-liquid-solid separation is difficult. Then, great amounts of the solid particles flowed out of the contacting vessel.

The above experimental results show that the contacting process in accordance with this invention is superior.

EXAMPLE 2

Experiment was performed under the conditions shown in Table 2 using the same equipment as in Example 1.

TABLE 2

| | |
|---|---|
| Dimension of the contacting vessel | $L = 500$ cm<br>$D = 28$ cm<br>$D_1 = 6$ cm |
| Packing (a cylinderical shape with 4 pores) | Material, stainless steel (SUS 27); dimension 15 mm (diameter) × 15 mm height, thickness 1.0 mm, pore diameter 4.0 mm |
| Solid particles | Particles of a Co—Mo catalyst on the silica-alumina carrier, spherical with a diameter of 1.2 mm, true specific gravity 3.20 |
| Properties of fluid | Liquid (lubricant)<br>Density 0.854 (g/cc) (20° C.)<br>Viscosity 1.28 (g/cm.sec.) (20° C.)<br>Gas ($H_2$ gas)<br>Density $0.089 \times 10^{-3}$ (g/cc) (20° C.)<br>Viscosity $8.0 \times 10^{-5}$ (g/cm.sec.) (20° C.) |
| State of packing | $L_1 = 150$ cm, $L_2 = 420$ cm $L_3 = 250$ cm; the ratio of the superficial volume occupied by the porous packed bed to the real volume of the packing = 2.48; the ratio of the average pore diameter of the porous packing to the average particle diameter of the solid particle = 3.33 |

The experiment was conducted under the above conditions while introducing the liquid at a superficial velocity of 12.0 cm/sec. and the $H_2$ gas at a superficial velocity of 3.1 cm/sec. The expansion factor of the solid particles could be reduced to below 1.4, and the fluidized state was very uniform. The amount of the solid particles which flowed out of the contacting vessel was only less than 0.001% by volume, which could be neglected.

In spite of the fact that the superficial velocity of the liquid in this experiment was very severe for the operating range of the present invention, very good results were obtained. This demonstrates the superiority of the present invention.

When the above experiment was conducted without using the porous packing, the expansion factor of the solid particles increased to more than 3.5, and gas-liquid-solid separation became difficult. The amount of the solid particles entrained by the gas reacted was as much as 8% by volume.

EXAMPLE 3

Experiment was performed under the conditions shown in Table 3.

TABLE 3

| Dimension of the contacting vessel | L = 300 cm<br>D = 40 cm<br>$D_1$ = 10 cm |
|---|---|
| State of packing | $L_1$ = 230 cm<br>$L_2$ = 260 cm |

The packing was a Raschig ring made of porcelain and having a diameter of 25 mm, a height of 25 mm and a thickness of 3 mm with 32 pores having a diameter of 4 mm.

Spherical solid particles of molecular sieve with an average diameter of 1 mm, a true specific gravity of 2.20, and an apparent specific gravity of 0.65 were introduced into the porous packed layer to a height of 90 cm. Naphtha containing 30 ppm of water was contacted with the molecular sieve particles in order to remove the water.

The superficial velocity of the naphtha was adjusted to 2.0 cm/sec. and 5.0 cm/sec. under such a condition that the ratio of the superficial volume occupied by the porous packed bed to the real volume of the porous packing was adjusted to 4, and the ratio of the average pore diameter of the porous packing to the average particle diameter of the solid particles, to 4. In any case, the fluidized state was very uniform, and the molecular sieve particles did not at all flow out.

EXAMPLE 4

Experiment was performed under the conditions shown in Table 4.

TABLE 4

| Dimension of the contacting vessel | L = 550 cm<br>D = 28 cm<br>$D_1$ = 8 cm |
|---|---|
| State of packing | $L_1$ = 400 cm<br>$L_2$ = 450 cm |

The packing was a Raschig ring made of porcelain and having a diameter of 25 mm, a height of 25 mm and a thickness of 3 mm with 32 pores having a diameter of 4 mm. Spherical solid particles of molecular sieve having an average particle diameter of 1.5 mm, a true specific gravity of 2.20 and an apparent specific gravity of 0.65 were placed to a height of 200 cm in the porous packed bed. Naphtha containing 30 ppm of moisture and hydrogen containing 25 ppm of moisture were fed as fluids, and contacted with the molecular sieve particles in order to remove the moisture. The ratio of the superficial volume occupied by the porous packed layer to the real volume of the porous packing was adjusted to 4, and ratio of the average pore diameter of the porous packing to the average particle diameter of the solid particles, to 4. The superficial velocity of the naphtha was adjusted to 2.0 cm/sec. and 5.0 cm/sec., respectively, and the superficial velocity of the hydrogen gas to 0.5 cm/sec., and 2.0 cm/sec., respectively. As a result, it was confirmed that the hydrogen bubbles were dispersed very finely, and the molecular sieve particles did not flow out of the contacting vessel.

EXAMPLE 8

Hydrodesulfurization reaction was performed using a reactor of the type shown in FIG. 1, and the conditions of the reactor and the operating conditions shown in Tables 5 and 6. There can be obtained the product having the properties shown in Table 6.

In the hydrosulfurization reaction also, the catalyst particles exhibited a very stable fluidized state, and even when the operating conditions were changed, no substantial amounts of the catalyst particles flowed out of the reactors.

Moreover, the oil and the hydrogen-containing gas separated well from the catalyst particles. By the way, the catalyst particles were exchanged every 30 hours or so while conducting the operation. However, the steady state of the reaction remained unchanged, and no change was seen in the state of the resulting product.

TABLE 5

| Dimension of the contact vessel | L = 200 cm<br>D = 10 cm<br>$D_1$ = 2.5 cm |
|---|---|
| Porous packing (wire net) | Material, stainless steel (SUS 27); dimension 15 mm (diameter) × 15 mm (height), mesh 2.0 mm × 2.0 mm, thickness of the wire net 0.5 mm in diameter |
| Catalyst | Particles of a Co—Mo catalyst on a silica-alumina carrier, spherical with a diameter of 0.9 mm; true specific gravity 3.22 |
| State of packing | $L_1$ = 80 cm, $L_2$ = 160 cm, $L_3$ = 60 cm, ratio of superficial volume occupied by the porous packed bed/real volume occupied by the porous packing = 21.5; the ratio of the average pore diameter of the packing to the average particle diameter of solid particles = 22 |
| Reaction conditions | Temperature 380° C.<br>Pressure 140 kg/cm².G<br>LHSV (1/hr) 0.30<br>Time for continuous operation 300 hrs<br>Amount of oil circulated 10.0 (m³/m³)<br>Hydrogen based on oil 1300 (Nm³/m³) |

TABLE 6

| Properties of oils | Starting oil | Product |
|---|---|---|
| Type of starting oil | Iranian light atmospheric distillation residue oil | |
| Total S content (wt. %) | 2.40 | 0.29 |
| Degree of desulfurization (%) | — | 87.7 |
| Residual carbon content (wt. %) | 6.70 | 2.13 |
| Yield (%) based on the material | — | 96.5 |
| Viscosity (cst. at 50° C.) | 137.1 | 52.64 |
| Asphaltene content (wt. %) | 1.68 | 0.10 |
| Vanadium (ppm) | 60 | 11 |
| Nickel (ppm) | 15 | 3 |

What is claimed is:

1. In a process for fluidized contact in a mixed phase by intimately contacting a liquid or a mixture of a liquid and a gas with solid particles to fluidize the particles, wherein a double pipe contact portion having an inner pipe contact portion and an outer pipe contact portion is formed by inserting an open-ended inner pipe of substantially cylindrical shape of diameter $D_1$ into a lower part of a contact vessel of substantially cylindrical shape of diameter D in such a way that upper and lower parts of the inner pipe communicate with middle and lower parts of the contact vessel respectively, a packed bed is provided by filling a porous packing in the inside of the contact vessel so as to surround at least the upper part of the inner pipe, the physical conditions of said packed bed being such that the ratio of superficial volume occupied by the packed bed to real volume of the packing is at least 1.3 and the ratio of the average pore diameter of the pores of the packing to the average particle diameter of the solid particles is 1.1 to 10, and the solid particles are filled in the outer pipe contact portion, the improvement which comprises:

(1) feeding the liquid or the mixture of the liquid and the gas from the lower part of the contact vessel to the inner pipe contact portion to flow up the solid particles inside the inner pipe contact portion along with the liquid or the mixture of the liquid and the gas as a blend, further allowing the blend to overflow into the packed bed from the upper part of the inner pipe contact portion, (2) separating part of the liquid or part of the mixture of the liquid and the gas from the solid particles and most of the liquid in the packed bed, (3) flowing up the part of the liquid or the mixture of part of the liquid and the gas in the contact vessel, uniformly contacting the liquid with the gas in the upper part of the contact vessel, then separating the liquid from the gas, withdrawing them from the contact vessel respectively, (4) flowing down said most of the liquid and the solid particles in the outer pipe contact portion to the lowest part of the double pipe contact portion, circulating the blend into the inner pipe contact portion along with a liquid or a mixture of a liquid and a gas which is freshly supplied, (5) withdrawing part of the solid particles from the lower part of the double pipe contact portion continuously or intermittently, and introducing fresh solid particles into the upper part of the outer pipe contact portion, (6) $D/D_1 = 3.5$ to 8, and (7) the upper end of the inner pipe is of a tapered shape which is enlarged upward and the opening thereof is made of a porous sheet the pores of said sheet having a pore diameter which is smaller than the minimal size of said porous packing.

2. The process of claim 1 wherein the following condition is satisfied:

$$D/D_1 = 4-8$$

wherein D is the diameter of the contact vessel and $D_1$ is the diameter of the inner pipe.

3. The process of claim 1 wherein the following condition is satisfied:

$$L_1/D = 1-20$$

wherein $L_1$ is the height of the packed bed and D is the diameter of the contact vessel.

4. The process of claim 3 wherein the ratio $L_1/D$ is from 3.0 to 15.0.

5. The process of claim 1 wherein the average particle diameter of said solid particles is in the range of 0.1 to 10 mm and the true specific gravity thereof is in the range of 1.20 to 8.00.

6. The process of claim 5 wherein the ratio of the average pore diameter of the pores of the porous packing to the average particle diameter of solid particles is within the range of from 1.5 to 5.0.

7. The process of claim 1 wherein the upper end of the layer of solid particles expanded by fluidization is maintained in the inside of the packed bed.

8. The process of claim 1 wherein the ratio of superficial volume occupied by the porous packed bed to real volume of the porous packing is at least 1.3 and the ratio of the average pore diameter of the pores of the porous packing to the average particle diameter of the solid particles is 1.5 to 5.0.

9. The process of claim 1 wherein the superficial liquid velocity $U_1$ (based on the inner pipe) of the liquid in the contact zone is greater than the minimum fluidization velocity $U_{f1}$ (based on the inner pipe) of solid particles caused by the liquid but is less than 12.0 cm/sec.

10. The process of claim 9 for fluidized contact in a mixed phase by intimately contacting a mixture of a liquid and a gas with solid particles and wherein the superficial gas velocity $U_g$ (based on the inner pipe) of the gas is greater than 0 but less than 8.0 cm/sec.

11. The process of claim 10 wherein the following conditions are satisfied:

$$2.0 \text{ cm/sec} < U_1 < 6.0 \text{ cm/sec.}$$

and $$0 < U_g < 4.0 \text{ cm/sec.}$$

12. The process of claim 1 wherein the upper end of the inner pipe is tapered at an angle of from 45° to 60°.

* * * * *